United States Patent
Deter et al.

[11] Patent Number: 5,854,659
[45] Date of Patent: Dec. 29, 1998

[54] APPARATUS AND METHOD FOR GENERATING A PROCESSED VIDEO PICTURE BY INTERPOLATING INTENSITIES OF AN ORIGINAL VIDEO PICTURE

[75] Inventors: Christhard Deter; Dieter Hubrich; Olaf Kotowski, all of Gera; Dirk Loeffer, Brahmenau, all of Germany

[73] Assignee: LDT GmbH & Co. Laser-Display-Technologie KG, Gera, Germany

[21] Appl. No.: 765,531

[22] PCT Filed: Apr. 26, 1996

[86] PCT No.: PCT/EP96/01760

§ 371 Date: Jan. 7, 1997

§ 102(e) Date: Jan. 7, 1997

[87] PCT Pub. No.: WO96/36175

PCT Pub. Date: Nov. 14, 1996

[30] Foreign Application Priority Data

May 11, 1995 [DE] Germany .......... 195 17 357.0

[51] Int. Cl.⁶ .......... H04N 7/01
[52] U.S. Cl. .......... 348/458; 348/448
[58] Field of Search .......... 348/458, 441, 348/440, 446, 448; 382/297, 300

[56] References Cited

U.S. PATENT DOCUMENTS

| | | |
|---|---|---|
| 4,523,220 | 6/1985 | Adelson . |
| 4,670,773 | 6/1987 | Silverberg . |
| 4,890,160 | 12/1989 | Thomas .......... 348/454 |
| 5,036,393 | 7/1991 | Samad et al. .......... 348/452 |

FOREIGN PATENT DOCUMENTS

| | | |
|---|---|---|
| 33 06 328 | 9/1983 | Germany . |
| 34 01 809 | 7/1984 | Germany . |
| 33 44 524 | 6/1985 | Germany . |
| 34 35 265 | 4/1986 | Germany . |
| 39 19 253 | 1/1990 | Germany . |
| 38 41 073 | 6/1990 | Germany . |

OTHER PUBLICATIONS

"Signal Processing of HDTV"L'Aquila, Italy Feb. 29—Mar. 2, 1988 (XP 00075084 / pp. 471–485).

(List continued on next page.)

*Primary Examiner*—Victor R. Kostak
*Attorney, Agent, or Firm*—McAulay Nissen Goldberg Kiel & Hand, LLP

[57] ABSTRACT

In a process for processing a first video picture with image points in $m_1$ lines, whose image points in the $l_1$-th line have an intensity $I_1(t, l_1)$ depending on a parameter t, in particular depending on time, for generating a second video picture with $m_2$ lines, the respective intensity $I_2(t, l_2)$ of an image point in the $l_2$-th line of the second video picture is interpolated from the intensities of the image points of the first video picture $I_1(t, l_1)$, wherein $I_2$ is obtained according to the following equation:

$$I_2(t,l_2) = Max(J(t,l_2)+\Delta;0),$$

where the values J, with respect to the lines, represent discretized values of a signal waveform given by the sampling theorem and in which an offset $\Delta$ is provided for partial compensation of negative intensities of the discretized signal waveform J so that the interpolation with respect to the lines is effected with A as a freely selectable amplitude of positive value according to the following equation:

$$J(t, l_2) = \sum_{l_1} A \cdot \frac{\sin\left(\pi \cdot \left\{\frac{m_1}{m_2} l_2 - l_1\right\}\right)}{\pi \cdot \left(\frac{m_1}{m_2} l_2 - l_1\right)} \cdot I_1(t, l_1)$$

An apparatus contains corresponding circuit parts for generating the second video picture according to the indicated process.

17 Claims, 7 Drawing Sheets

OTHER PUBLICATIONS

"An Optical Approach To Digital Raster Mapper Design", Knutson, et al (IEEE Transactions on Consumer Electronics, Nov. 4, 1991, vol. 37, No. 4 / pp. 746–752).

Excerpt from DTV–Lexikon de Physik (p. 41).

"Signal Processing Of HDTV, II" Turin, Italy Aug. 30—Sep. 1, 1989 (pp. 665–673).

Catalogue :Seleco 626 to 1250 Upconverter For HDFP Projector Description (3 pgs).

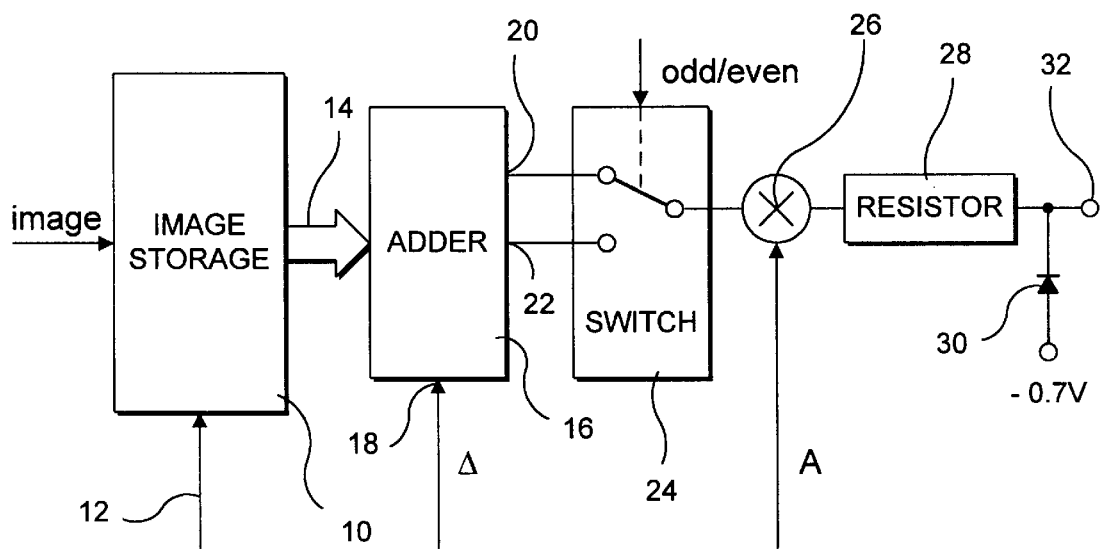
F I G. 4
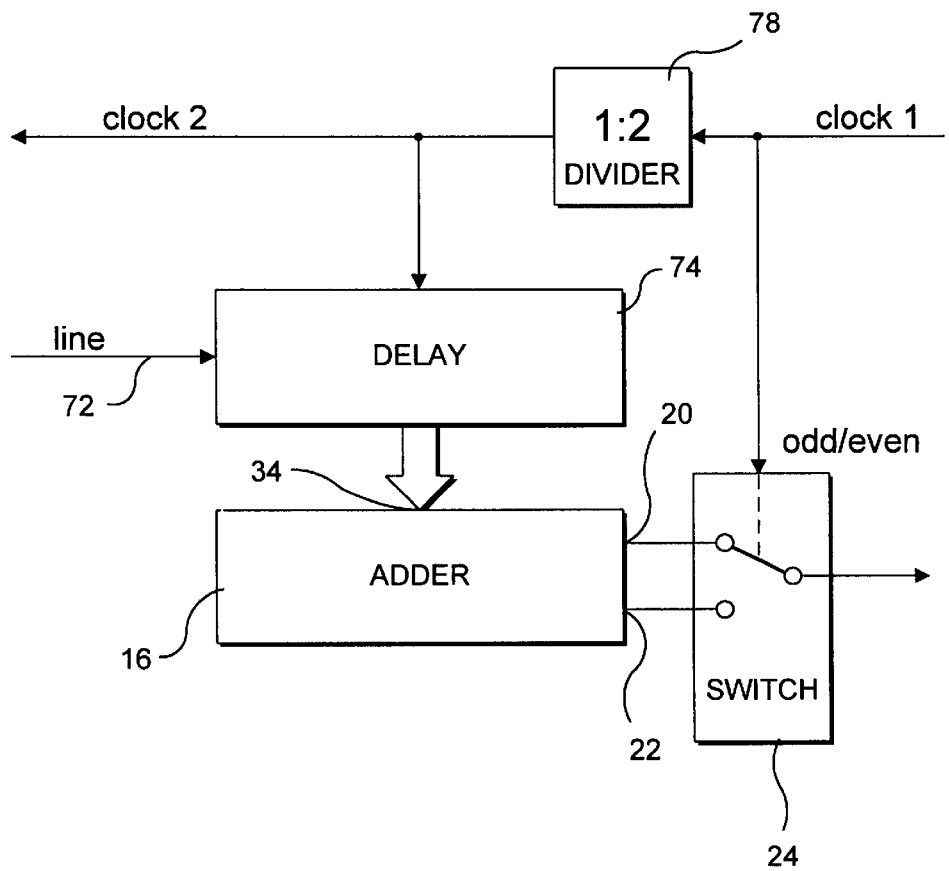
F I G. 6

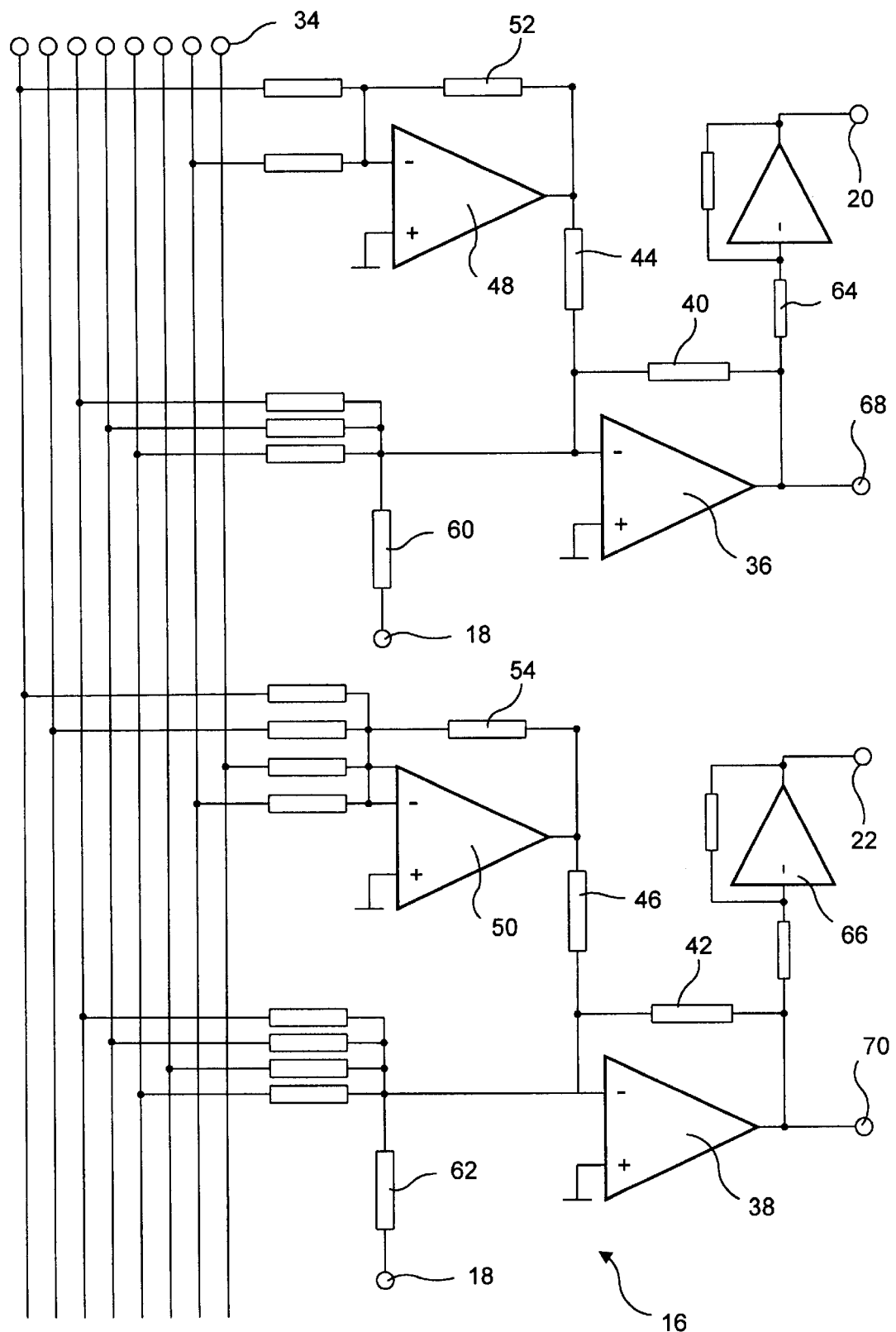
F I G. 5

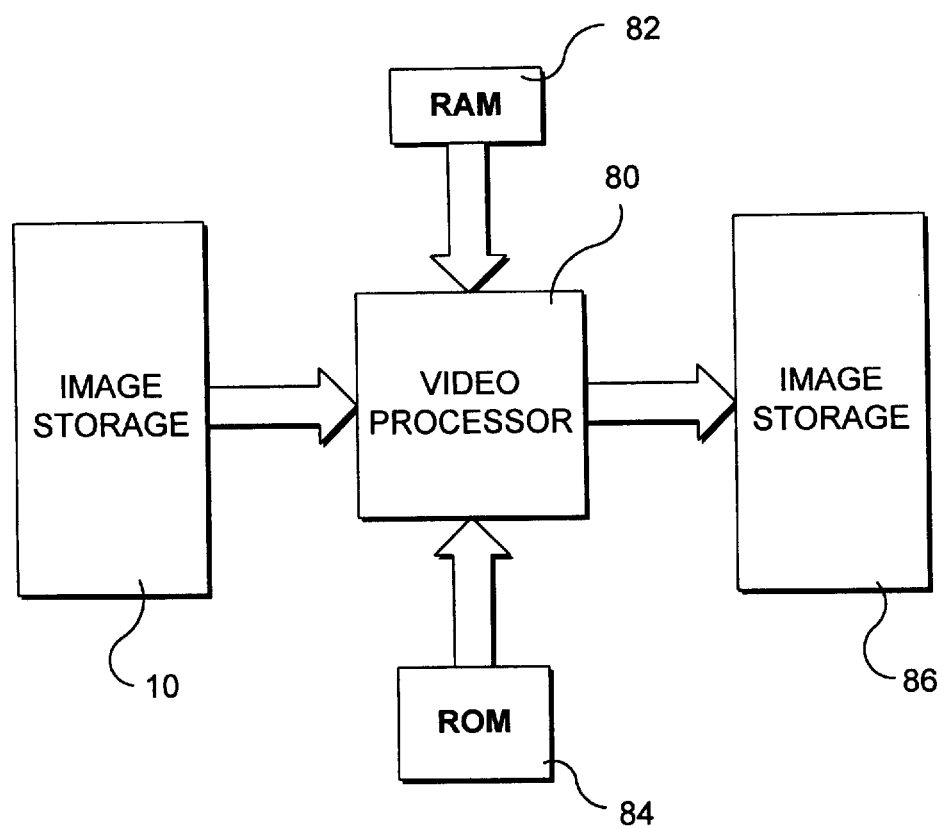
F I G. 7

APPARATUS AND METHOD FOR GENERATING A PROCESSED VIDEO PICTURE BY INTERPOLATING INTENSITIES OF AN ORIGINAL VIDEO PICTURE

BACKGROUND OF THE INVENTION

1. Field of the Invention

The invention is directed to a process for processing a first video picture with image points in $m_1$ lines, whose image points in the $l_1$-th line have an intensity $I_1(t, l_1)$ depending on a parameter t, in particular depending on time, for generating a second video picture with $m_2$ lines. The invention is further directed to an apparatus for processing a first video picture with image points in $m_1$ lines, whose image points in the $l_1$-th line have an intensity $I_1(t, l_1)$ depending on a parameter t, in particular depending on time, for generating the image points of a second video picture with $m_2$ lines.

2. Description of the Related Art

Different video standards with respect to the number of lines and the number of image points per line require conversion, e.g., a transmitted PAL image for showing in a HDTV receiver. The simplest solution is to down-scale the PAL images on the HDTV screen. However, this is unsatisfactory since the customer tolerates the greater expenditure and accordingly the higher cost for HDTV because of the large picture which can be achieved, among other reasons.

In order to make full use of the screen size, it would also be possible to read the PAL image into an image storage which is then read out in accordance with the resolution of the HDTV standard. However, in so doing, the poorer resolution of the PAL image becomes noticeable, particularly on very large HDTV screens, in that individual image points are further resolved by the eye of the viewer. This is disturbing. Improved image quality for PAL images shown in a HDTV receiver is desirable.

The aforementioned conversion of PAL into HDTV was only mentioned as an example. The same problems occur whenever the number of image points or the number of lines of the reproduced image is greater than that of the received image.

A number of proposed solutions for increasing resolution are found in the literature.

According to the teaching in DE 38 41 037 A1, the color transform of a color signal is used to transmit additional information for a 16-to-9 image. Reception is also possible with a conventional receiver so that investment is required on the part of the consumer only if reception of the improved image quality is desired.

Similarly, DE 38 19 253 C1 describes the transmission of additional information, in this case on a high-frequency carrier in sidebands. In DE 33 44 524, the luminance signal is provided with additional information.

U.S. Pat. No. 4,607,773 teaches a process in which different numbers of frames and lines are transmitted depending on the image content, in particular depending on the degree of motion. This process requires a suitable processor for decoding. Further, the process can only be carried out when the transmitter is provided with a motion sensor, filter devices for band limiting, a high-resolution camera, and additional modulation devices.

DE 34 01 809 A1 and DE 34 35 265 are directed to signal processing in high-resolution television cameras for transmission within conventional band limits.

All of these suggestions require processing of the signals on the transmission end. For this purpose, high investments are required on the transmission end as well as on the reception end. Since systems of this kind can also only be introduced in practice by appropriate standardization, such solutions will probably only be realized in the remote future.

It would be desirable to obtain a higher-resolution image from signals which are already currently available for video pictures. In this case, a higher-quality image could be generated and shown or recorded simply by means of an appropriate added device for a television receiver or another video system such as a video recorder.

OBJECT AND SUMMARY OF THE INVENTION

The primary object of the present invention is to find a process and to provide a corresponding apparatus enabling an increased image resolution with higher image quality for video pictures, wherein the apparatus is also characterized, above all, by a simple construction.

The part of this object relating to the process is met in that the respective intensity $I_2(t, l_2)$ of an image point in the $l_2$-th line of the second video picture is interpolated from the intensities of the image points of the first video picture $I_1(t, l_1)$, wherein $I_2$ is obtained according to the following equation:

$$I_2(t,l_2) = Max(J(t,l_2) + \Delta; 0),$$

where the values J, with respect to the lines, represent discretized values of a signal waveform given by the sampling theorem and in which an offset $\Delta$ is provided for partial compensation of negative intensities of the discretized signal waveform J so that the interpolation with respect to the lines is effected with A as a freely selectable amplitude of positive value according to the following equation:

$$J(t, l_2) = \sum_{t_1} A \cdot \frac{\sin\left(\pi \cdot \left\{\frac{m_1}{m_2} l_2 - l_1\right\}\right)}{\pi \cdot \left(\frac{m_1}{m_2} l_2 - l_1\right)} \cdot I_1(t, l_1) \qquad (1.0)$$

The process provides an interpolation between the lines of the first video picture for generating the second video picture. In a very general way, interpolations are represented mathematically as follows:

$$I_2(t, k_2) = \sum_{k_1} I_1(t, k_1) \cdot g_{k_2 - k_1}. \qquad (1.1)$$

The intensity $I_2$ of an image point of the second video picture is thus interpolated by means of weighting values g from the intensities $I_1$ of the adjoining image points of the first video picture with reference to the image. Mathematics provides a great variety of interpolation methods. The best known of these methods is linear interpolation in which the interpolation value is determined as a function on a straight line through the two adjacent values.

Conclusions can be reached concerning the processing of the information from the general form of equation 1.1. A Fourier transform of this equation shows that the frequency information in the intensities $I_1$ can be weighted differently by g with respect to their amplitudes depending on the occurring frequencies. The different weighting depends upon the selected weighting values g, i.e., upon the type of interpolation. On the other hand, when weighting variables g are selected which cause the low-frequency component to rise sharply, a low-resolution image is formed. With weighting values g which cause the high-frequency component to rise sharply, the resolution is improved, but noise is also increased disproportionately, since the signal-to-noise ratio in conventional video pictures is less favorable at high frequencies than at low frequencies.

In the process according to the invention, the weighting values g are selected in such a way that all frequencies of the first video picture are uniform in terms of frequency. The weighting contained in equation 1.0 via a sin(x)/x dependency describes a rectangular distribution in Fourier representation. Therefore, all transmitted frequencies are uniformly weighted and the information content is not changed. Thus, as a result of the process according to the invention, precisely the maximum resolution contained as information in the first video picture is achieved without increasing noise. This is the optimal solution. With regard to information content, reference is made to the pertinent textbooks. Reference is made only by way of example to *dtv-Lexikon der Physik*, Deutscher Taschenbuch Verlag GmbH & Co. KG, Munich, volume 1, 1969, page 41, keyword: "Sampling theorem".

When the weighting values applied in the process according to the invention are applied to a jump in intensity from 0 to 1 between two image points, it will be noted that an interpolated value of 0.45 is given for the intensity between the image points for an image point in the second video picture, whereas a purely linear interpolation would give 0.5. Thus, the difference between the results is very small. For this reason, a priori, it cannot be expected that the process according to the invention results in a substantial improvement compared to linear interpolation. It is possible that the person skilled in the art would reject the process according to the invention as too complicated because of the occurring sine function and, further, would even regard it as disadvantageous that negative and therefore non-physical intensities can be obtained because of the sine function, although these intensities are set at zero in the process according to the invention.

However, it has been shown surprisingly that very highly structured first video pictures, when processed by the process according to the invention, result in a second video picture which is substantially sharper than that achieved when applying linear interpolation. However, this can be explained when it is considered that very highly structured images in a Fourier representation of the image contain substantial frequency components as high frequencies. Since higher frequencies are attenuated in the linear interpolation method in accordance with Fourier representation, this linear interpolation method does not enable a substantial improvement in very highly structured video pictures. In contrast, the process according to the invention takes all frequencies into account uniformly.

The process according to the invention also teaches how negative sum values can be handled so that they do not cause serious problems. The negative values are eliminated partly or completely by adding an offset $\Delta$ and/or in that remaining negative values for the second video picture are set at zero. Preferred possibilities for selecting the offset will be discussed in more detail hereinafter.

Contrary to first appearances, the sine function occurring in equation 1.0 also does not mean that cumbersome calculations will be necessary. Since the arguments in the sine always take on identical values in every image point, it is possible, for every combination of line numbers $m_1$ and $m_2$ occurring in practice, to compile tables for the corresponding weighting functions sin(x)/x, so that the process can be carried out just as quickly as any other interpolation. When analog networks are used for the summation, the weighting values g can be realized simply by means of fixed resistance values in a network. Therefore, the process according to the invention can also be used for image processing in real time.

Above all, the maximum possible resolution is achieved in an advantageous manner in the process according to the invention since the information content of the first video picture is utilized in its entirety for the second video picture. This means that the best possible image quality is achieved. However, the image points of the first video picture are not imaged directly for this purpose since this is disturbing, as was described above.

The preceding observations relate only to the number of lines. However, a similar processing is also possible for the image points within a line when the number of image points per line of the second video picture is greater than the number of image points per line of the first video picture. However, if the signal for the line information of the first video picture with respect to time t is continuously present, this seems to be of little value since the information content is not changed by the process itself; that is, no improvement can be expected by discretizing the image points of a line of the first video picture with subsequent weighting according to the sampling theorem.

The situation must be viewed otherwise when the first video picture is taken, e.g., from an image storage or from an image plate, that is, the lines in $n_1$ image points in the first video picture are present according to the standard of the first video picture and the second video picture with $n_2$ image points per line is to be discretized with respect to parameter t, so that the intensities or color signals of the first video picture can be represented as $I_1(k_1, l_1)$ for the $l_1$-th image point in the $l_1$-th line and the intensities or color signals of the second video picture can be represented as $I_2(k_2, l_2)$, or the likewise discretized signal waveforms can be represented as $J(k_2, l_2)$ for the $k_2$-th image point in the $l_2$-th line. According to a preferred further development of the process, the interpolation of image points within a line is then likewise effected according to the sampling theorem, so that $$I_2(k_2,l_2)=Max(J(k_2,l_2)+\Delta;0)$$

with $$J(k_2, l_2) = \sum_{l_1,k_1} A \cdot \frac{\sin\left(\pi \cdot \left\{\frac{m_1}{m_2} l_2 - l_1\right\}\right)}{\pi \cdot \left(\frac{m_1}{m_2} l_2 - l_1\right)} \cdot \frac{\sin\left(\pi \cdot \left\{\frac{n_1}{n_2} k_2 - k_1\right\}\right)}{\pi \cdot \left(\frac{n_1}{n_2} k_2 - k_1\right)} \cdot I_1(k, l_1) \quad (2.0)$$

The advantages of this process with respect to the processing of image points of a line are the same as those discussed in the preceding with reference to the processing of lines of video pictures. The weighting functions under the sum show a product of sine functions. This also means that no difficulties will arise, since equation 2.0 allows the image processing of lines and the line processing of image points to be carried out as successive steps. Thus, the first video picture can be converted into the second video picture, e.g., by means of a plurality of processors which determine the image point intensity for different image points in the line in a parallel manner for a plurality of image points with subsequent processing of the lines. Fast processing in real time is then also possible.

The suppression of negative values is discussed in the following. In order to compensate for the negative intensities occurring in calculations, an offset Δ is introduced in the process according to the invention. When suitably selected, this offset shifts the obtained signal intensities into the positive range.

According to a preferable further development, the offset Δ is set at the maximum value of the negative signal waveform J for every video picture.

This results in the advantage that all of the information in the second video picture can be represented. Slight contours at low intensities remain discernable. However, this process according to the further development requires that all processed image points be interrogated before the offset can be applied. The time factor can be critical.

For this reason, in another preferred further development of the invention, the offset is set at zero. The vanishing offset saves additional summation in real-time processing. However, the correct representation of structures with low brightness in the first video image is forfeited. But for applications in which time is critical as, for example, in television reception, the viewer substantially discerns the movements of the dominant structures in terms of brightness so that the information loss caused by the cutting off of negative intensities can easily be dispensed with. In return, however, edges are substantially sharper resulting in the impression of a substantially increased image sharpness.

According to a preferable further development, the amplitude A mentioned above can also be set at 1 for reasons of speed.

However, when time constraints are to be excluded, e.g., when using a fast video processor, the amplitude A for each video picture is set in such a way, according to a preferred further development, that the same integral brightness is achieved in the second video picture as in the first video picture.

Because of the sine in equation 1.0 and the cutting off of negative signals, a change in brightness amounting to a few percentage points can be effected with the same information, depending on the image points in a moving video picture, by means of processing from image to image. This could manifest itself by a slight flickering of the picture with the amplitude A remaining constant for all images. In order to prevent this effect, the brightness of the second video picture is standardized at the brightness of the first video picture. In practical terms, in order to reduce the calculating time for a video processor, for example, the total brightness in the first and second video picture is summed to determine the brightness of each video picture. The amplitude A is then calculated from the ratio of the integral brightness of the first video picture to that of the second video picture and this amplitude A is then taken into account in the individual intensities, e.g., as a gain factor, when showing the image. Thus, in this process A takes precedence over the sums of equations 1.0 or 2.0. This enables very rapid processing.

As was already explained, the sin (x)/x functions occurring under the summation sign can be represented as constant weighting values which are determined by resistance values in analog processing of the second video picture from the first video picture or by table values when processing by means of a video processor. The number of weighting values required is heavily dependent on the ratios $m_1/m_2$ and $n_1/n_2$, since the latter determine the cycle in which $l_2$ or $k_2$ leads back to an integral numerical value of $m_1*l_2/m_2$ or $n_1*k_2/n_2$.

When $m_1$ and $m_2$ and $n_1$ and $n_2$ are suitably selected, the sine functions give periodically identical values in the numerator sin(x) and the necessary quantity of table values or the magnitude of the network in analog processing is defined.

This advantage of a small quantity of weighting values can always be achieved, in accordance with a preferred further development of the invention, in that the first video picture with $m_1$ lines and $n_1$ image points per line is generated from an original video picture with $n_0$ image points and $m_0$ image points per line, where $n_1 > n_0$ and $m_1 > m_0$ and the additional image points of the first video picture compared to the original video picture enclose the original video picture as a border. The intensities of the image points in the border are then equated with a black level.

Thus, the black border formed according to this further development allows a new degree of freedom by means of which the ratios $m_2/m_1$ and $n_2/n_1$ can be selected optionally in accordance with requirements. This results in a simplification in an embodiment form of a circuit design for carrying out the process, in particular when analog circuits are used. When the process is carried out by digital technique, the quantity of stored table values is advantageously reduced, which results in a reduction in calculating time when the algorithm for summation is suitably selected.

An apparatus, according to the invention, by which the proposed object is met has an adder circuit which interpolates the intensity $I_2(t, l_2)$ of an image point of the second video picture in the $l_2$-th line from the intensities $I_1(t, l_1)$ of the image points of the first video picture in that the intensities $I_1$ of the image points of the first video picture are added so as to be weighted over a given quantity of lines in order to generate a signal waveform $J(t, l_2)$ for a line $l_2$ of the second video picture in accordance with the equation $$J(t, l_2) = \sum_{l_1} A \cdot \frac{\sin\left(\pi \cdot \left\{\frac{m_1}{m_2} l_2 - l_1\right\}\right)}{\pi \cdot \left(\frac{m_1}{m_2} l_2 - l_1\right)} \cdot I_1(t, l_1)$$

at an amplitude A which is fixed for the second video picture. Further, the apparatus has a suppression circuit which leaves positive values of J substantially unchanged and suppresses negative values of J and whose output reproduces the intensities $I_2(t, l_2)$ of the image points of the second video picture.

This apparatus is constructed in a particularly simple manner and allows the process described above to be carried out in a simple manner. The sin(x)/x functions below the sum are fixed weighting values which can be realized, for instance, for summation by means of specially adapted resistance values in an analog adder circuit. Negative intensities are cut off by means of the suppression circuits for display.

A further simplification of the circuit results when the suppression circuit is formed of a resistor and a diode which is connected to an offset voltage, wherein the offset voltage is determined by the threshold of the diode. Such circuits are known to the person skilled in the art In addition to the simple design, these circuits also make it possible to optimize the cut-off behavior. When the resistance value is suitably selected, the operating range of the characteristic can be adjusted in such a way that cutting off is effected logarithmically with small or negative intensities. Accordingly, structures also remain discernable with low brightness. Thus, the features according to this further development not only enable a simple construction of the apparatus according to the invention, but are also suitable for improving the image quality.

According to a preferable further development, the adder circuit is designed for summing an offset Δ. In this way it is possible, for example, to compensate for the threshold value of the diode indicated in the further development described above.

In another apparatus according to the invention, cutting off via suppression circuits can be omitted. This apparatus is characterized by an adder circuit which interpolates the intensity $I_2(t, l_2)$ of an image point of the second video picture in the $l_2$-th line from the intensities $I_i(t, l_1)$ of the image points of the first video picture in that the intensities $I_1$ of the image points of the first video picture are added in a weighted manner over a given quantity of lines in order to generate a signal waveform $J(t, l_2)$ for a line $l_2$ of the second video picture according to the following equation $$J(t, l_2) = \sum_{l_1} A \cdot \frac{\sin\left(\pi \cdot \left\{\frac{m_1}{m_2} l_2 - l_1\right\}\right)}{\pi \cdot \left(\frac{m_1}{m_2} l_2 - l_1\right)} \cdot I_1(t, l_1)$$

at an amplitude A which is fixed for the second video picture, wherein $I_2(t, l_2)$ result from $J(t, l_2)$ by adding an offset Δ whose magnitude is selected so as to compensate precisely for negative values in the signal waveform J.

Accordingly, the offset is used to prevent the possible occurrence of negative image point intensities. The suppression circuit mentioned above can then be dispensed with in accordance with the process described above in which the offset was fixed at the maximum negative value of the signal waveforms J.

As has already been indicated, the process and the apparatus can be applied to analog continuous input signals for every line. However, if the first video picture is taken from an image storage or an image plate, the image can also be discretized according to the image points per line, which may also require the application of an interpolation with respect to the image points within a line. In this case, when $n_1$ is the number of image points of the first video picture and $n_2$ is the number of image points per line of the second video picture, a preferred further development provides an interpolation of the intensity $I_2(k_2, l_2)$ of the $k_2$-th image point of the $l_2$-th line for the second video picture from the intensities $I_i(k_1, l_1)$ of the respective $k_1$-th image point of the $l_1$-th line of the first video picture by means of the adder circuit in that a signal waveform J which is discretized with respect to image points and lines for generating the second video picture is formed according to the following equation $$J(k_2, l_2) = \sum_{l_1, k_1} A \cdot \frac{\sin\left(\pi \cdot \left\{\frac{m_1}{m_2} l_2 - l_1\right\}\right)}{\pi \cdot \left(\frac{m_1}{m_2} l_2 - l_1\right)} \cdot \frac{\sin\left(\pi \cdot \left\{\frac{n_1}{n_2} k_2 - k_1\right\}\right)}{\pi \cdot \left(\frac{n_1}{n_2} k_2 - k_1\right)} \cdot I_1(k, l_1),$$

and the intensities $I_2$ are equated with the positive values of J, but negative values of J are suppressed by the suppression circuit and/or by the addition of an offset Δ.

In this apparatus, the image points/line are also handled in an equation according to the sampling theorem when processing, as was already discussed. Accordingly, an increased resolution with respect to the image points is achieved in every line.

According to another preferred further development, the apparatus according to the invention has a video processor which contains the adder circuit and/or the suppression circuit or can be controlled in a corresponding manner via a suitable program.

In comparison with the examples given above with analog summation of the intensities or colors via adjacent image points, this further development enables a substantially more flexible adaptation to different standards. Video processors of this kind are commercially available and can be obtained at a low price. Further, the expenditure on circuits is lower in the case of the video processor in most applications for the process according to the invention than in conventional circuit solutions. The cost of the apparatus according to the invention is thus advantageously reduced through the use of a video processor.

When suitably programmed, the video processor can also take over the function of the suppression circuit. A further advantage consists in the flexibility of a video processor which allows the application of a wide variety of algorithms.

As was already mentioned, only a partial suppression of the information content in negative intensities is possible, e.g., by means of the logarithmic characteristic of a diode. The use of a video processor, however, also allows logarithmic characteristics other than those mentioned above for suppression. Thus, when a video processor is used, a further improvement in the image quality can be brought about without additional expenditure on circuits.

Since video processors are freely programmable to a great extent, a simple realization of the aforementioned further development of the process in which the brightness of the second video picture is standardized to that of the first video picture is also possible. In addition, it is provided in a preferred further development that the video processor can be controlled by means of a program in such a way that the amplitude A is determined in real time and, when generating the signal waveform J, can be acted upon in such a way that the integral brightness of the second video picture is identical to the integral brightness of the first video picture.

According to another preferable further development of the invention, a display device is provided for displaying the second video picture so as to allow different image points to be illuminated on a screen without regard to standards.

A monitor, for example, can be used as the display device. However, a video device in which all means for carrying out the process according to the invention are already integrated can also be used.

The feature whereby the individual image points can be illuminated regardless of the standard is not provided in a commercially available color television picture tube which can only illuminate the image points given by an aperture mask. On the other hand, e.g., black-and-white picture tubes whose electron beam can be directed to any desired image point of the picture tube in a continuous manner by suitably controlling the deflection coils or deflection plates are suitable.

The further development not only enables different image sizes, but also allows the weighting functions occurring in equations 1.0 and 2.0 to be optimized in a manner other than that described in the preceding since, as a result of the number of lines and image points per line in the display device which are freely selectable based on the further development, the quotients $n_1/n_2$ and $m_1/m_2$ are always given in a suitable manner for reducing the quantity of weighting values by making use of the periodicity of the sine function in the indicated equations. The way in which these quotients must be selected has already been described fully in the preceding in connection with the border around the original video picture.

This does not present a problem for the generation of black-and-white pictures, since black-and-white picture tubes do not require aperture masks. However, a color television picture can also be produced with one black-and-white picture tube per color if the individual color images imaged with the latter are projected onto one another by means of a specially adapted optical system.

According to another preferred further development of the invention, in relation to this solution with picture tubes, a continuous scanner is provided for reflecting a light beam, which is controlled by intensity $I_2$, in the display device, in which, depending upon the scanning conditions, different picture standards can be realized with respect to the number of image points and the number of lines of the imaged picture. In an apparatus of this kind, the second video picture is generated by a light beam. This is advantageous because substantially higher light intensities can be achieved in the image point for large screens. Further, practically any desired image size can be adjusted by selecting the distance from the screen. When the light beams are virtually parallel, as is known in lasers, for example, the sharpness does not change when the distance changes.

The image quality is accordingly advantageously improved due to the features of this further development.

The light beam can be deflected, for example, by means of acousto-optical components. However, in a preferred further development, the scanner contains a rotating polygon mirror and a swivel mirror. As a result of this feature, substantially greater deflection angles can be achieved compared with acousto-optical modulation. Further, the inertia of the polygon mirror results in a particularly favorable synchronous running which does not depend on the operating voltage. The image quality is accordingly further improved.

Additional features of the invention are also indicated in the following description of embodiment examples with reference to the drawings.

BRIEF DESCRIPTION OF THE DRAWINGS

In the drawings:

FIG. 4 shows a schematic view of an embodiment example for carrying out the process by means of analog circuits;

FIG. 5 shows an adder circuit which is used in the embodiment example shown in FIG. 4;

FIG. 6 shows an embodiment example for doubling the number of image points/line of the second video picture with respect to the first video picture using the adder circuit shown in FIG. 5;

FIG. 7 shows a schematic view of an embodiment example for carrying out the process with a video processor.

DESCRIPTION OF THE PREFERRED EMBODIMENTS

The process according to the invention accentuates high frequencies better than conventional interpolation methods and therefore best illustrates it advantages when applied to highly structured video pictures. Further, the information content is not changed so that, in spite of the accentuation of high frequencies, noise signals are not increased by the process.

Figure 1:
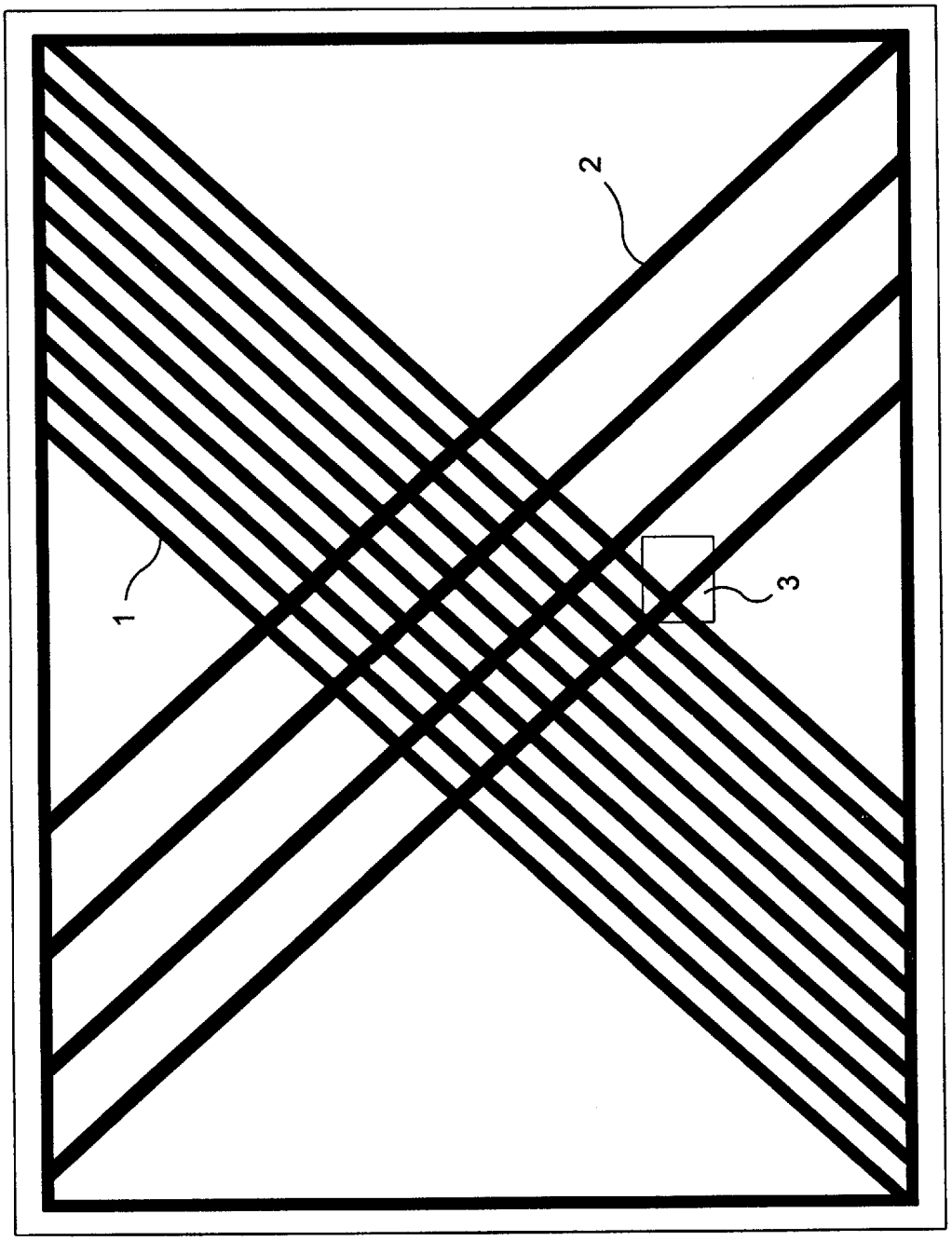
FIG. 1 shows a video picture which was processed by the process according to the invention to demonstrate doubled number of lines and image points/line.
Figure 2:
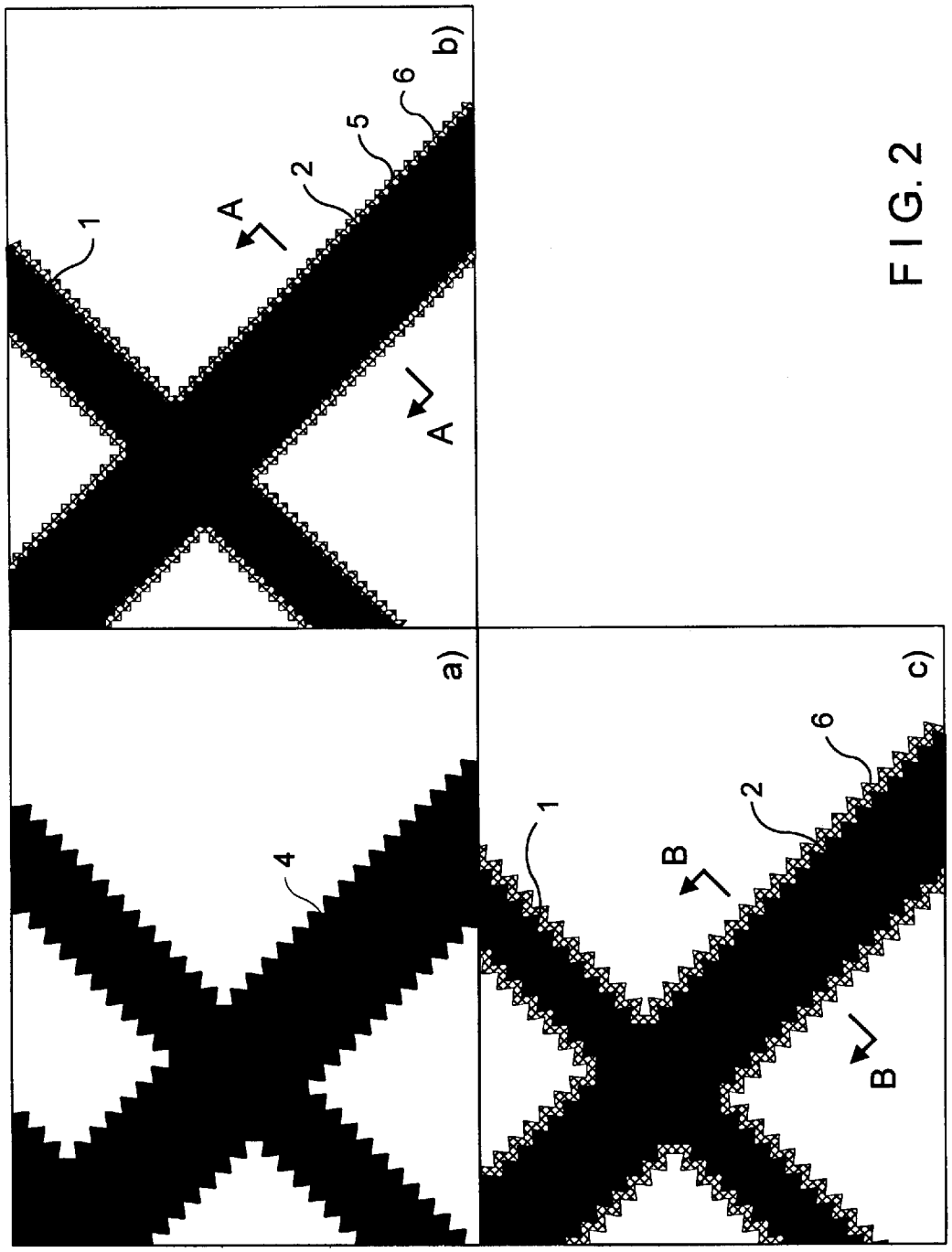
FIG. 2 shows an image section of the video picture generated with doubled number of lines and image points/line according to FIG. 1 for demonstrating the process: a) image without processing, b) after processing by the process according to the invention, c) after processing by linear interpolation.
Figure 3:
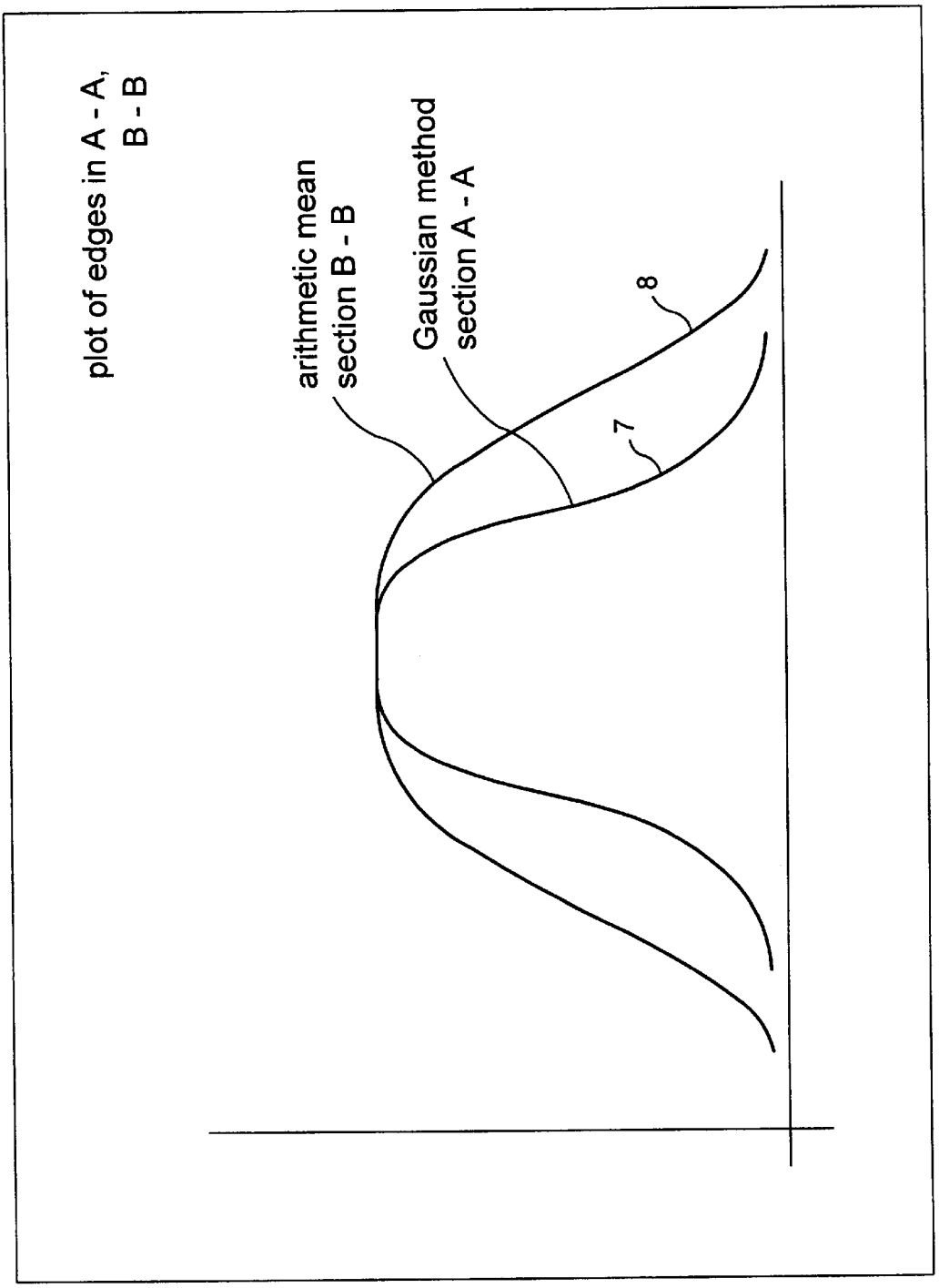
FIG. 3 shows intensity distributions along section A—A in FIG. 2b and along section B—B in FIG. 2c.

For the purpose of demonstrating the process in the case of highly structured images, FIGS. 1 to 3 show the changing of an image with stripe patterns when displayed with higher image point density. FIG. 1 shows the video picture without processing with ten thin stripes 1 running from the upper right side to the lower left side. These stripes 1 are intersected by four thicker stripes 2 extending at right angles thereto.

Also shown in FIG. 1 is an image section 3 which is shown in an enlarged view in FIG. 2 with a doubled number of lines and image points/line. FIG. 2a, in which there is no interpolation, clearly shows that the individual image points 4 are perceived as rectangular steps. This effect is extremely disturbing for the viewer in PAL pictures which are displayed on a large screen. However, the process according to the invention serves to reduce such disturbing structures by means of a weighted summation of adjacent image points.

The process according to the invention was applied to the video picture shown in FIG. 1 which will be referred to hereinafter as the first video picture. For this purpose, equation 2.0 was used for this demonstration of the process while taking into account that the number of lines and image points of a second video picture are doubled with respect to the first video picture. The results are shown in FIG. 2b. The disturbing steps of the image points 4 seen in FIG. 2a no longer occur in FIG. 2b. However, new step-like structures 5 are caused by the image points of the second video picture and can only be reduced by further increasing the number of image points per line and the number of lines.

Further, FIG. 2b shows a shaded area 6 which is produced by the utilized process and which appears gray in real video pictures. This gray area assists the eyes in compensating for the rectangular stepped structures 5 of the second video picture when the video picture is viewed from some distance so that the diagonally extending stripes 1 and 2 are perceived substantially without the stepped structures 5.

For the purpose of comparing the results obtained by the process according to the invention according to FIG. 2b with another interpolation, FIG. 2c also shows a second video picture resulting from the application of linear interpolation to the first video picture shown in FIG. 2a. A comparison between FIG. 2b and FIG. 2c will show the following:

The steps 5 are considerably more pronounced with the linear interpolation.

The gray area is considerably smaller in the image obtained by the process according to the invention.

The smaller gray area can also be seen from FIG. 3. In FIG. 3, the intensity is represented as the ordinate in relation to the plot of section A—A, shown in FIG. 2b, as curve 7 and section B—B, shown in FIG. 2c, as curve 8. High intensity indicates black and low intensity is imaged as white in the video pictures shown in FIGS. 1 and 2.

On the one hand, the curves 7 and 8 shown in FIG. 3 show that the transitional region from black to white in the process according to the invention is smaller compared with the linear interpolation. On the other hand, it can also be seen that the flanks are substantially steeper in the process according to the invention.

The basis of the process according to the invention and other interpolation methods consists in that the brightness for an image point in a line $l_2$ formed in the second video picture is formed from the brightness values of the locally adjacent lines $l_{1-n}$ of the first image by means of weighted summation. This weighting can also be carried out in an analog manner according to image points of a line.

The weighting values can be represented in the process according to the invention by a sine(x)/x function. They can be presented as table values for calculation. Accordingly, the weighting values need not be calculated anew for every image point and the process is carried out more quickly so that it can be implemented in real time for video pictures even with currently available processors.

The quantity of weighting values required is reduced if the ratio $m_1/m_2$ of the number of lines of the first video picture to the number of lines of the second video picture or the ratio $n_1/n_2$ with respect to the number of image points of the line, respectively, is suitably selected such that the sine function occurring in the weighting values gives periodic function values. This can always be achieved when, instead of the number of lines $m_1$, $m_2$ and number of image points $n_1$, $n_2$ given by the respective television standard, values $m_1$, $n_1$ greater than those given by the standard are used. Thus, the first video picture is enlarged in that it is supplemented by a black border prior to transformation.

In the doubling of the number of lines and number of image points which is used in FIGS. 1 to 3, the periodicity of the sine is given. It is then necessary to distinguish between two cases for weighting:

1. The line of the second video picture whose image point brightness values are to be calculated is identical with a line of the first video picture with respect to the image.
2. The line of the second video picture whose image point brightness values are to be calculated lies between two lines of the first video picture with respect to the image.

The weighting values are calculated in both cases as follows:

$$\frac{\sin\left(\pi \cdot \left\{ \frac{m_1}{m_2} l_2 - l_1 \right\}\right)}{\pi \cdot \left(\frac{m_1}{m_2} l_2 - l_1\right)} = \frac{\sin(\pi \cdot \{0.5 \cdot l_2 - l_1\})}{\pi \cdot (0.5 \cdot l_2 - l_1)}$$

It will be noted from this equation that the doubling of the number of lines advances the arguments in the sine by a half. If $l_2$ is an even number, there is always a line $l_1$ in which the argument vanishes. This will be referred to hereinafter as case 1. In the second case, $l_2$ is an odd number.

If the term $(0.5\ l_2 + l_1)$ is designated by h, the weighting values listed in the following table are calculated:

TABLE

| Case 1: | | Case 2: | |
|---|---|---|---|
| \|h\| | weighting | \|h\| | weighting |
| 0 | 1.0 | 0.5 | 0.45 |
| 1 | 0.32 | 1.5 | 0.15 |
| 2 | 0.00 | 2.5 | −0.09 |
| 3 | −0.11 | 3.5 | −0.06 |

TABLE-continued

| Case 1: | | Case 2: | |
|---|---|---|---|
| \|h\| | weighting | \|h\| | weighting |
| 4 | 0.00 | 4.5 | 0.05 |
| 5 | 0.06 | 5.5 | 0.04 |
| 6 | 0.00 | 6.5 | −0.03 |
| 7 | −0.05 | 7.5 | −0.02 |
| etc. | | etc. | |

The table clearly shows that the weighting values drop sharply with h. For example, if it is desirable to carry out the process only with an accuracy of up to 10%, only the table values up to h=4 need be taken into account.

With the negative values of h which must likewise be taken into account and whose weighting is identical to that of the positive values of h, only 8 lines of the first picture need be accounted for in order to obtain image point brightness values of a line of the second video picture. The error brought about by ignoring weighting values at higher values of h involves only low frequencies, as can be made clear by Fourier representation of the sin(x)/x function. Therefore, ignoring the weighting values substantially corresponds to a change in brightness of the entire picture. However, this can be partially compensated for by taking into account factor A, mentioned above, in equations 1.0 and 2.0.

These considerations also apply in an analogous manner to the use of the process for increasing the number of image points per line of the second video picture with respect to the first video picture. The same weighting values are then taken into account, but the values of h relate to the image point distances (h=0.5 $k_2 - k_1$) within a line.

FIG. 4 shows an embodiment example for an apparatus in which an analog video signal—such as that present at the output of a tuner—of a first video picture is stored with the aforementioned weighting values with respect to lines in order to obtain a second video picture with a doubled number of lines. The video information is first stored in an analog or digital image storage 10. The storage is effected in this embodiment example with the number of image points/line of the second video picture. A transformation in accordance with equation 2.0 for processing the video picture with respect to image points of a line can then be dispensed with, since a weighted summation of this kind within a line does not change the information content according to the sampling theorem.

The image storage 10 in FIG. 4 serves to synchronize the lines of the first video picture for processing by means of an analog network. However, different delay lines could also be provided for synchronization instead of the image storage 10. However, an image storage 10 is also advantageous in the case of a video picture which is received from a transmitter because the video pictures are transmitted in fields in accordance with the television standard, which leads to increased expenditure when delay lines are used for synchronization. On the other hand, the first video picture is stored in the image storage 10 in lines and columns so that the information can be retrieved when desired in order to generate the second video picture.

The line information required for processing a line of the second television picture is addressed by means of a digital word in the image storage 10 and is read out of the image storage 10, this digital word being applied via control lines 12. Proceeding from the outputs of the image storage 10, this line information is applied synchronously, via a plurality of lines 14, to the inputs of an adder circuit 16 which carries out the summation according to the process. An additional analog input 18 by means of which a freely selectable offset Δ can be added to the processed line information is also provided in the adder circuit 16. This offset Δ was already explained in detail in the preceding.

As has already been described, a plurality of lines of the first video picture can be formed for a plurality of lines of the second video picture by means of summation according to equation 1.0, wherein different weighting values occur depending on whether the line to be generated is even or odd.

The adder circuit 16, which will be described in more detail hereinafter with reference to FIG. 5, is so designed that it has two outputs 20 and 22 at which the weighted sums for case 2 and case 1, with reference to the table, are read out independently from one another. An analog switch 24 is provided for switching the signals at the outputs 20 and 22. Because of the high switching frequencies required in video pictures in real time, this analog switch 24 is realized by two MOS-FET's whose source-drain channels take over the switching function. For further processing of the information of the second video picture, the switched signal arrives at the input of an amplifier 26 whose gain A can be adjusted by an analog voltage at the input 27.

The amplifier 26 can be a commercially available multiplying amplifier. It serves to take into account factor A which was discussed above. In particular, the gain which can be changed by means of the amplifier 26 via input 27 is suitable for adapting the gain slightly to the same image brightness in the second video picture as in the first video picture. This was already discussed in the preceding and contributes to an improved image quality.

In another embodiment example, not shown, a constant factor A is used. The amplifier 26 is omitted in this case and the desired gain A is taken into account in terms of circuitry in the adder circuit 16.

In the embodiment example according to FIG. 4, the output of the amplifier 26 is connected with a voltage divider formed of a resistor 28 and a diode 30. In this voltage divider, the diode 30 is connected, parallel to an output 32, to a fixed potential which corresponds to the threshold voltage of the diode 30. Since a silicon diode was used in the embodiment example, the fixed potential is set at −0.7 V. A potential of approximately 0.2 V would be provided, for example, in germanium diodes.

The diode 30 and the resistor 28 serve as a suppression circuit for negative signals. The suppression circuit ensures that physically meaningless negative intensities generated by the adder circuit 16 for image points which can be generated by the partially negative weighting values in the process according to the invention are set at low positive, physically meaningful intensities.

The cut-off behavior of the suppression circuit is not only determined by the selection of factor A and offset Δ, but can also be selected by choosing the resistance 28 with respect to the characteristic of the diode 28.

A very low-impedance resistor 28 results in an almost abrupt cutting off of negative signals by the diode 30. When the resistor 28 is selected with an appropriately high impedance, however, the substantially exponential part of the diode characteristic can be adjusted as an operating point so that the output signal of the voltage divider formed of the resistor 28 and the diode 30 logarithmically approaches zero asymptotically at low and negative intensities. As a result of this dimensioning of the resistor 28 in the embodiment example, even the information which would be cut off if the resistor 28 were designed with low impedance remains clearly visible in the second video picture. The information content is not substantially reduced by this circuit in spite of the cutting off of negative information.

The voltage curve generated in this way and present at the output 32 is proportional to the sequential intensities of the image points of the second video picture. These image points can be represented sequentially as an image in a display device which will be described hereinafter or can be used in another way, e.g., for storage in an additional image storage. The image storage 10 and the analog switch 24 are controlled by a control device, not shown in FIG. 4, depending on the way in which the second video picture is further processed.

There are two essential points with respect to the control. First, in order to generate the k-th image point of line $l_2$, the image storage 10 is so controlled that the image point intensities of image points k of a plurality of lines $l_1$, which image points k are situated one below the other with respect to the image, these image intensities being present as analog voltage, are applied to the lines 14. Second, the analog switch 24 is switched depending on whether the image point intensity required at the output 32 is to be generated for an even line or odd line.

The control is designed in a particularly simple manner in the case of sequential processing of the image points from the image storage 10 such as is effected, e.g., for raster scanning of a television frame for linewise and framewise display of an image, but which cannot be applied for the transmission of a video picture in an image storage for receiving the second television frame.

Digital signals with which the image points $k_i$ required for processing can be addressed are also supplied via the control lines 12. In the embodiment example, these signals are generated digitally by means of a cyclic counter. When the counter is reset to zero, a digital line counter is connected in addition. The lowest bit of this line counter serves to switch over the analog switch 24. The higher bits are entered, via control lines 12, in the image storage 10 so that it applies all intensities of the image points of the lines required for generating an image point of the second video picture to its outputs.

The intensities required from the image storage 10 for generating a line of the second video picture, that is, the addressed lines of the first video picture, are illustrated with reference to the adder circuit 16 shown in FIG. 5.

Eight inputs 34 are shown in the upper left-hand corner of FIG. 5. The line information of the lines $l_1$ given by $h=(0.5 \, l_2+l_1)$ is applied to the inputs 34 from left to right depending on the given case 1 or 2 according to Table I when generating the second video picture. For case 1, these lines are given by progressive values of $h=-3; -2; -1; 0; 1; 2; 3; 4$ and, for case 2, by $h=-3.5; -2.5; -1.5; -0.5; 0.5; 1.5; 2.5; 3.5$.

The lines required for the line information at inputs 34 can now be calculated simply by means of the equation $l_1=h-0.5 \, l_2$. For example, the image point intensities of lines 7; 8; 9; 10; 11; 12; 13; 14 are applied to the inputs 34 in order to generate line 20 of the second video picture. However, the same lines are used in the adder circuit 16 also for line 21, that is, for case 2. Clearly, as was already mentioned, the lowest bit of the line counter need only be used to switch the analog switch 24, while the image points with respect to the line of the first video picture which are to be read out of the image storage are only controlled by the higher bits of the line counter.

Further, it will be seen that negative values for $l_1$ can also occur as a result of the negative values of h. In the embodiment example, the image storage is so designed that the image point information of such lines is equated with the black level of the respective television standard. Accordingly, a black border is added in a fictitious manner to the first video picture. The lines $l_1$ of the video picture which result in a purely mathematical manner as $l_1$ number of lines which is greater than the maximum number of lines $m_1$ in the television image according to the first video picture are also treated in the same way.

For this embodiment example, only 8 lines of the first video picture are used in the process for generating a line of the second video picture. As was already mentioned, only a small permissible error occurs as a result of this limitation because of the weighting values which drop sharply with h. However, in the event of stricter requirements, the same principle used in this embodiment example can also be used for more input lines, wherein the adder circuit need only be taken into account in the following description by additional resistors.

It will be seen from FIG. 5 that the adder circuit 16 is substantially formed of two parts, one for generating an output signal at output 20 and another for generating an output signal at output 22.

The core of each part is an operational amplifier 36 and 38, respectively, which is designed as a summing amplifier and is fed back via a resistor 40 and 42, respectively. The inverting inputs of the operational amplifier 36 and 38 are connected not only with the inputs 34 via resistors for the purpose of a weighted summing of the input voltages, but are also connected in each instance, via another resistor 44 and 46, respectively, with the output of another operational amplifier 48 and 50, respectively, which is designed as a summing amplifier. A negative-feedback resistor 52 and 54 is again provided for the purpose of configuring the operational amplifier 48 and 50 as a summing amplifier.

The operational amplifiers 48 and 50 invert the input signal and take into account the negative weighting values which occur in the process as negative values due to the sin(x)/x function. The line information which must be multiplied by negative weighting values according to the sum in equation 1.0 is first added via the operational amplifiers 52 and 54 before it is added, with an opposite mathematical sign, to the output sum via the operational amplifiers 36 and 38.

In the embodiment example, every resistor 40, 42, 44, 46, 52 and 54 has a value of 1 kΩ so that the resistance values of the values located between the input line 34 and the inverting inputs of the operational amplifiers 36, 38, 48 and 50 are calculated as 1 kΩ divided by the absolute amount of the weighting which is given in the table for the respective value of h effective for weighting the voltage present at the respective input 34 with respect to the line which is read out of the image storage 10. With reference to the table, case 1 applies to the upper part of the summing circuit and case 2 applies to the lower part of the summing circuit in FIG. 5.

Further, resistors 60 and 62 are provided at the inverting inputs of the operational amplifiers 36 and 38. The offset which was discussed above is taken into account as a voltage by means of these resistors 60 and 62. Further, another inverting amplifier 64 and 66, respectively, is connected between the outputs of the operational amplifiers 36 and 38 and the outputs 20 and 22 of the adder circuit 16 in order to generate positive output voltages with positive input connections with the adder circuit. If negative voltages are required for further processing, they can also be tapped at outputs 68 and 70.

The entire adder circuit 16 is designed in the embodiment example for summation according to equation 1.0 with factor A=1, since this factor is taken into account subsequently via the amplifier 26 as was discussed with reference to FIG. 4. An additional amplifier 26 can be dispensed with if A is selected as a constant when the circuit is designed for gains other than 1 in a manner known to the person skilled in the art, e.g., by changing the negative-feedback resistors 40 and 42.

The embodiment example described with reference to FIGS. 4 and 5 was discussed, by way of example, exclusively in relation to the increase in the number of lines in the second video picture relative to that in the first video picture. An increase in the quantity of image points per line was not addressed. This was not necessary because the line information was present in analog form and the image points of every line were already transformed and stored at an increased clock rate for storage in the image storage 10.

In other applications, e.g., when the image information originates from a video CD, the image point intensities are present as digital values in the number of image points per line given by the video standard of the first video image, so that an increase in the image points within a line via interpolation is equally meaningful. The first video picture can then be stored in the image storage 10 and additional adder circuits 16 for processing the image points of a line can also be provided for processing the lines.

A circuit of this type is shown in FIG. 6. It generates a greater quantity of image points in the output lines from the image points of a line. The embodiment example according to FIG. 6 is designed for doubling the number of image points so that the weighting values indicated in the table can again be used.

In the example shown in FIG. 6, the line information is present at the input 72 in digital form and is retrieved sequentially from an image storage or image plate, or possibly also from an individual buffer, by means of pulses referred to as clock 2. This digital information is then entered in a multiple-stage delay circuit 74 which is also controlled by clock 2. The respective intensities of individual successive image points in the line to be processed are present in parallel at the outputs of the individual stages of the delay circuit 74 as analog voltage values which are fed into the inputs 34 of the adder circuit 16 shown in FIG. 5.

The delay circuit 74 can be a shift register, the digital outputs of its individual stages being converted via a digital-to-analog converter. However, in the embodiment form, the quantity of digital/analog converters was reduced in that the digital signals present at the input 72 were first converted into analog voltages and the delay was effected in a manner known in the art by means of a bucket brigade by reversing the charge of capacitors. The time periods between successive image points are in the millisecond range so that a possible discharge of capacitors is negligible. However, in the case of slower image transmission, e.g., in the case of image reception by some weather satellites, the aforementioned delay circuit 74 which operates via shift registers can be omitted in an apparatus for carrying out the process.

The adder circuit 16 was designed for 8 input lines so that only 8 stages needed to be provided for the delay circuit 74, as well. With a greater accuracy of the weighted summation than is possible by means of the circuit according to FIG. 5, the number of stages of the delay circuit 74 and the number of summing resistors in the circuit 16 are also increased.

The delay circuit 74 is reset before each line, i.e., the capacitors are discharged in a defined manner in the bucket brigade circuit and the digital value zero is applied to the input 72 by a control unit at the termination of the entered line of the first video picture for 8 clock signals.

Accordingly, a black image border is produced in a manner analogous to that described in the preceding for the lines.

The image intensity for odd and even numbers of image points is again controlled via an analog switch 24. The switching is effected via a pulse referred to in FIG. 6 as clock 1 which is halved via a binary divider 78 to obtain clock 2. Accordingly, the intensities of the same image points of the first video picture are present at the adder circuit 16 for two cycles of clock 1, but the odd and even numbers of image points of the second video picture are switched through by clock 1. As was already discussed in the preceding with respect to the lines, this can be achieved by means of the adder circuit according to FIG. 6, since the same input information is required for odd and even output values.

The embodiment examples indicated above which were described essentially with reference to analog circuits have the advantage that they operate very quickly. However, the adaptation of factor A, for example, for a further improvement in the image quality depending on the image content is possible only by means of additional expenditure on circuits in that, e.g., the second image is first processed and then factor A is determined or in that the image information in the image storage 10 is evaluated before processing in the adder circuit, e.g., by a processor, in order to obtain the factor A to be applied.

In another embodiment example according to FIG. 7, a video processor 80 is used, according to the process, for weighted summing. The images shown in FIGS. 1 to 3, which have already been discussed, were generated by means of an embodiment example similar to the one shown in FIG. 7.

In the apparatus according to FIG. 7, the weighting values are calculated as table values depending on the image format of the first and second video picture and are stored in a RAM 82. The multiplication of the values of the image point intensities by the weighting values, as well as the summing, are effected digitally via the video processor 80. The summing and calculation of the weighting values are controlled by a program contained in a ROM 84 in accordance with equations 1.0 and 2.0. The image point intensities of the first video picture are read out of a first image storage 10 by the video processor via direct memory access (DMA) and the results of the calculations according to equation 1.0 or 2.0 are stored in a second image storage 86. The second image storage 86 can be read out directly and the second video picture stored therein can be viewed as an image on a screen e.g., by means of a display device.

In another embodiment example, not shown in the drawings, instead of a video processor, a plurality of processors are allowed to operate in different storage areas in order to increase speed. The modification of the circuit according to FIG. 7 required for this purpose is known to the person with expertise in the field of parallel computers.

As was already stated above, the quantity of weighting values to be taken into account and accordingly the expenditure on an apparatus for implementing the process is reduced principally by suitable selection of the factors $m_1/m_2$ and $n_1/n_2$ in the argument of the sine function. The factors $m_2$ and $n_2$ can be freely selected when the second video picture is imaged by means of a display device which allows every image point to be controlled in a continuous manner on the displaying screen.

Figure 8:
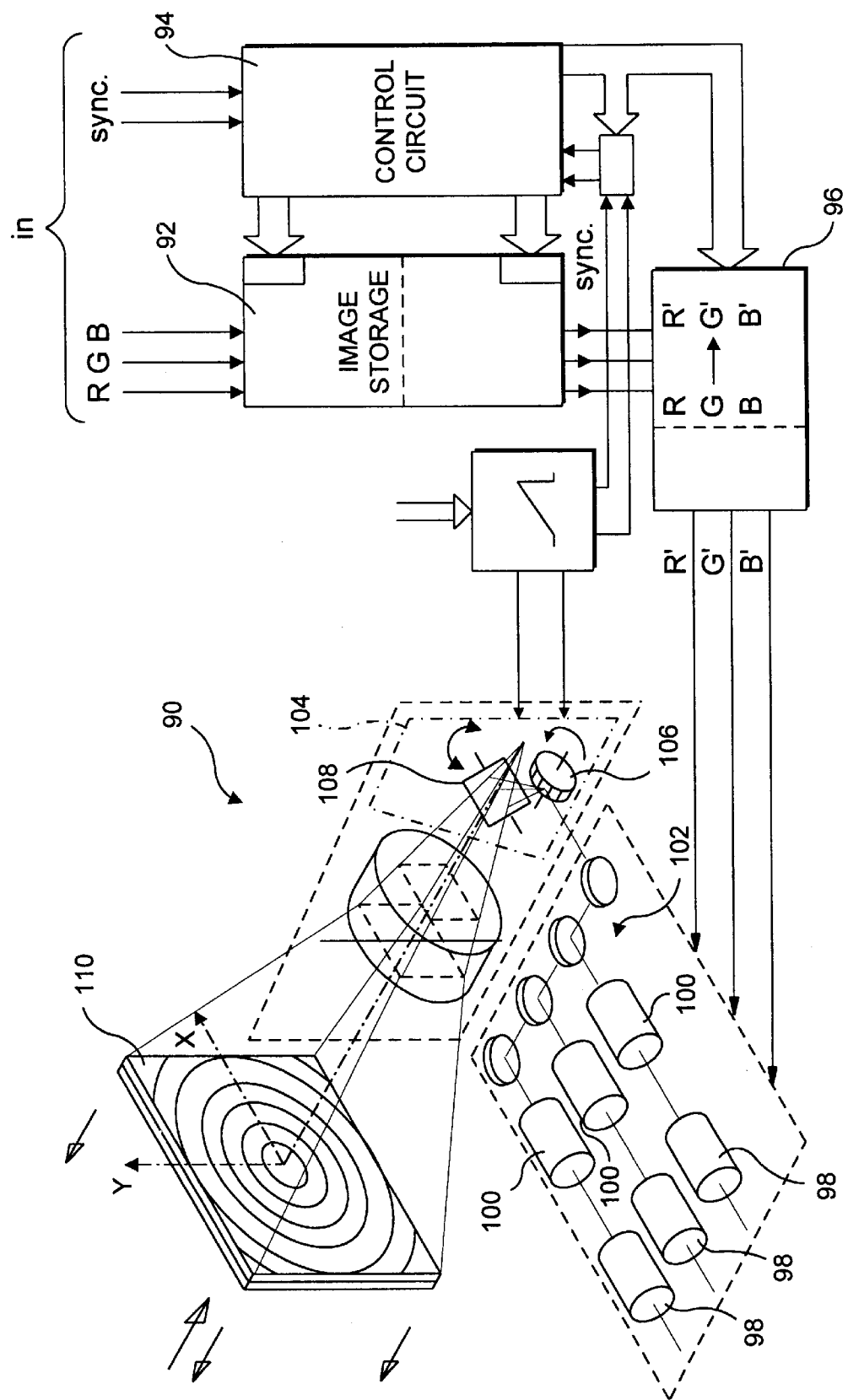
FIG. 8 shows a display device for displaying images in the embodiment examples shown in FIG. 4 to FIG. 7.

FIG. 8 shows such a display device 90. An image storage 92 is provided for framewise storage of the R,G,B signals generated by a tuner. The first video picture is transformed into the second video picture according to the process within the image storage by means of a video processor. A control device 94 controls the reading in and reading out of the image. Further, a matrix circuit 96 is provided for adapting the color signals in the image storage 9 to the colors used in the display device 90.

The display device uses three light sources 98 of different colors to generate the image point brightness and colors. In the embodiment example, these light sources 98 are lasers whose intensities are controlled by modulators 100. The light bundles which are modulated in this way are unified by a mirror 102 and directed to a mechanical scanner 104 which, in this embodiment example, is formed of a rotating polygon mirror 106 and swivel mirror 108 for deflecting the image points and lines. The second video picture is then displayed on a screen 110.

The mechanical scanner 104 enables a continuous control of every location on the screen 110. Accordingly, the image points per line and the number of lines of the second video picture can be freely selected in this display device so that the quantity of weighting values in the process according to the invention can always be selected in a favorable manner. The control of the mechanical scanner which differs for different standards is effected via a scanner control 112 which is likewise monitored by the control device 94.

The embodiment examples show how high image quality can be achieved in video pictures by means of the interpolation process according to the invention and the corresponding apparatus. The embodiment examples further demonstrate that it is currently possible to carry out the image processing required for this purpose in real time either by using analog circuits or by means of a plurality of video processors. Based on the increase in switching speeds of integrated circuits which is anticipated for the future, it can be expected that circuits will be further simplified for real-time applications, even with variable amplitudes A, variable offsets Δ or complicated cut-off characteristics.

While the foregoing description and drawings represent the present invention, it will be obvious to those skilled in the art that various changes may be made therein without departing from the true spirit and scope of the present invention.

What is claimed:

1. In a process for processing a first video picture with image points in $m_1$ lines, whose image points in the $l_1$-th line have an intensity $I_1(t, l_1)$ depending on a parameter t, in particular depending on time, for generating a second video picture with $m_2$ lines, the improvement comprising the steps of:

interpolating the respective intensity $I_2(t, l_2)$ of an image point in the $l_2$-th line of the second video picture from the intensities of the image points of the first video picture $I_1(t, l_1)$; and obtaining $I_2$ according to the following equation:

$$I_2(t,l_2) = Max(J(t,l_2) + \Delta; 0),$$

where the values J, with respect to the lines, represent discretized values of a signal waveform given by the sampling theorem and in which an offset Δ is provided for partial compensation of negative intensities of the discretized signal waveform J so that the interpolation with respect to the lines is effected with A as a freely selectable amplitude of positive value according to the following equation:

$$J(t, l_2) = \sum_{l_1} A \cdot \frac{\sin\left(\pi \cdot \left\{ \frac{m_1}{m_2} l_2 - l_1 \right\}\right)}{\pi \cdot \left(\frac{m_1}{m_2} l_2 - l_1\right)} \cdot I_1(t, l_1)$$

2. The process according to claim 1, wherein the line with respect to parameter t is also discretized in $n_1$ image points in the first video picture and the second video picture is discretized with $n_2$ image points per line with respect to parameter t, so that the intensities of the first video picture can be represented as $I_1(k_1, l_1)$ for the $k_1$-th image point in the $l_1$-th line and the intensities of the second video picture can be represented as $I_2(k_2, l_2)$, or the likewise discretized signal waveforms can be represented as $J(k_2, l_2)$ for the $k_2$-th image point in the $l_2$-th line, wherein the interpolation of image points within a line is then likewise effected according to the sampling theorem, so that $$I_2(k_2, l_2) = Max(J(k_2, l_2) + \Delta; 0)$$

with $$J(k_2, l_2) = \sum_{l_1, k_1} A \cdot \frac{\sin\left(\pi \cdot \left\{ \frac{m_1}{m_2} l_2 - l_1 \right\}\right)}{\pi \cdot \left(\frac{m_1}{m_2} l_2 - l_1\right)} \cdot \frac{\sin\left(\pi \cdot \left\{ \frac{n_1}{n_2} k_2 - k_1 \right\}\right)}{\pi \cdot \left(\frac{n_1}{n_2} k_2 - k_1\right)} \cdot I_1(k, l_1)$$

3. The process according to claim 1, wherein the offset $\Delta$ is set at the maximum value of the negative signal waveform J for every video picture.

4. The process according to claim 1, wherein the offset $\Delta$ is set at 0.

5. The process according to claim 1, wherein the selected value of the amplitude A is 1.

6. The process according to claim 1, wherein the amplitude A is set in such a way that the same integral brightness is achieved in the second video picture as in the first video picture.

7. The process according to claim 1, wherein the first video picture with $m_1$ lines and $n_1$ image points per line is generated from an original video picture with $n_0$ image points and $m_0$ image points per line, where $n_1 > n_0$ and $m_1 > m_0$, and the additional image points of the first video picture compared to the original video picture enclose the original video picture as a border, and the intensities of the image points in the border are then equated with a black level.

8. In an apparatus for processing a first video picture with image points in $m_1$ lines, whose image points in the $l_1$-th line have an intensity $I_1(t, l_1)$ depending on a parameter t, in particular depending on time, for generating the image points of a second video picture with $m_2$ lines, an improvement comprising:

adding circuit means for interpolating the intensity $I_2(t, l_2)$ of an image point of the second video picture in the $l_2$-th line from the intensities $I_1(t, l_1)$ of the image points of the first video picture in that the intensities $I_1$ of the image points of the first video picture are added so as to be weighted over a given quantity of lines in order to generate a signal waveform $J(t, l_2)$ for a line $l_2$ of the second video picture in accordance with the equation $$J(t, l_2) = \sum_{l_1} A \cdot \frac{\sin\left(\pi \cdot \left\{ \frac{m_1}{m_2} l_2 - l_1 \right\}\right)}{\pi \cdot \left(\frac{m_1}{m_2} l_2 - l_1\right)} \cdot I_1(t, l_1)$$

at an amplitude A which is fixed for the second video picture and; suppression circuit means which leaves positive values of J substantially unchanged and suppresses negative values of J and having an output for reproducing the intensities $I_2(t, l_2)$ of the image points of the second video picture.

9. The apparatus according to claim 8, wherein said suppression circuit means comprises a resistor and a diode which is connected to an offset voltage, wherein the offset voltage is determined by a threshold of said diode.

10. The apparatus according to claim 8, wherein said adding circuit means is designed for summing an offset $\Delta$.

11. In an apparatus for processing a first video picture with image points in $m_1$ lines, whose image points in the $l_1$-th line have an intensity $I_1(t, l_1)$ depending on a parameter t, in particular depending on time, for generating the image points of a second video picture with $m_2$ lines, an improvement comprising:

adding circuit means for interpolating the intensity $I_2(t, l_2)$ of an image point of the second video picture in the $l_2$-th line from the intensities $I_1(t, l_1)$ of the image points of the first video picture in that the intensities $I_1$ of the image points of the first video picture are added in a weighted manner over a given quantity of lines in order to generate a signal waveform $J(t, l_2)$ for a line $l_2$ of the second video picture according to the following equation $$J(t, l_2) = \sum_{l_1} A \cdot \frac{\sin\left(\pi \cdot \left\{ \frac{m_1}{m_2} l_2 - l_1 \right\}\right)}{\pi \cdot \left(\frac{m_1}{m_2} l_2 - l_1\right)} \cdot I_1(t, l_1)$$

at an amplitude A which is fixed for the second video picture, wherein $I_2(t, l_2)$ result from $J(t, l_2)$ by adding an offset $\Delta$ whose magnitude is selected so as to compensate precisely for negative values in the signal waveform J.

12. The apparatus according to claim 8, in which the first video picture is discretized with $n_i$ image points per line and in which the second video picture can be displayed with $n_2$ image points per line, wherein there is provided an interpolation of the intensity $I_2(k_2, l_2)$ of the $k_2$-th image point of the $l_2$-th line for the second video picture from the intensities $I_i(k_1, l_1)$ of the respective $k_1$-th image points of the $l_1$-th line of the first video picture by adding circuit means in that a signal waveform J which is discretized with respect to image points and lines for generating the second video picture is formed according to the following equation $$J(k_2, l_2) = \sum_{l_1, k_1} A \cdot \frac{\sin\left(\pi \cdot \left\{ \frac{m_1}{m_2} l_2 - l_1 \right\}\right)}{\pi \cdot \left(\frac{m_1}{m_2} l_2 - l_1\right)} \cdot$$

-continued $$\frac{\sin\left(\pi \cdot \left\{\frac{n_1}{n_2} k_2 - k_1\right\}\right)}{\pi \cdot \left(\frac{n_1}{n_2} k_2 - k_1\right)} \cdot I_1(k, l_1)$$

and the intensities $I_2$ are equated with the positive values of J, but negative values of J are suppressed by at least one of said suppression circuit means and the addition of an offset $\Delta$.

13. The apparatus according to claim 8, wherein said adding circuit means and said suppression circuit means are contained in a video processor or wherein said apparatus can be controlled in a corresponding manner via a suitable program.

14. The apparatus according to claim 13, wherein said video processor is controlled so that the amplitude A is determined in real time and, when generating the signal waveform J, can be acted upon so that the integral brightness of the second video picture is identical to the integral brightness of the first video picture.

15. The apparatus according to claim 8, wherein a display device is provided for displaying the second video picture so as to allow different image points to be illuminated on a screen without regard to standards.

16. The apparatus according to claim 15, wherein the display device includes a continuous scanner for reflecting a light beam, which is controlled by intensity $I_2$, in which, depending upon the scanning conditions, different picture standards can be realized with respect to the number of image points and the number of lines of the imaged picture.

17. The apparatus according to claim 16, wherein the scanner contains a rotating polygon mirror and a swivel mirror.

\* \* \* \* \*